United States Patent
Hanazawa et al.

[11] Patent Number: 5,940,056
[45] Date of Patent: Aug. 17, 1999

[54] LIQUID CRYSTAL DISPLAY DEVICE

[75] Inventors: Yasuyuki Hanazawa; Tomoko Kitazawa; Yuko Kizu, all of Yokohama, Japan

[73] Assignee: Kabushiki Kaisha Toshiba, Kawasaki, Japan

[21] Appl. No.: 08/834,179

[22] Filed: Apr. 15, 1997

[30] Foreign Application Priority Data

Apr. 15, 1996 [JP] Japan .................................. 8-092138

[51] Int. Cl.[6] ....................................................... G09G 3/36
[52] U.S. Cl. .............................................. 345/87; 345/100
[58] Field of Search ................................. 345/87, 90, 92, 345/93, 100, 103, 104; 349/123, 127, 139, 141, 145, 149, 151

[56] References Cited

U.S. PATENT DOCUMENTS

| | | | |
|---|---|---|---|
| 4,750,813 | 6/1988 | Ohwada et al. | 345/87 |
| 5,475,396 | 12/1995 | Kitajima et al. | 345/92 |
| 5,565,885 | 10/1996 | Tamanoi | 345/100 |

FOREIGN PATENT DOCUMENTS

61-147285  7/1986  Japan .

*Primary Examiner*—Vijay Shankar
*Attorney, Agent, or Firm*—Pillsbury Madison & Sutro LLP

[57] ABSTRACT

A liquid crystal display device is composed of an array substrate which includes a matrix array of pixel electrodes, a plurality of scanning liness formed along rows of the pixel electrodes, each for selecting the pixel electrodes of a corresponding row, a plurality of signal lines formed along columns of the pixel electrodes, for setting potentials of the pixel electrodes of a selected row, and an alignment film formed to cover the pixel electrodes, the scanning lines and the signal lines, a counter substrate which includes a counter electrode facing the matrix array of pixel electrodes, and an alignment film formed to cover the counter electrode, and a liquid crystal layer which is held between the array substrate and the counter substrate and has liquid crystal molecules aligned by the alignment films of the array and counter substrates. In the liquid crystal display device, the scanning line is formed to have a cutout at an intersection of the scanning and signal lines located on a side corresponding to pretilt-base ends of the liquid crystal molecules aligned by the alignment film of the array substrate, and the cutout is determined to reduce an electric field produced in the liquid crystal layer between the scanning line and the pixel electrode.

12 Claims, 7 Drawing Sheets

LIQUID CRYSTAL DISPLAY DEVICE

BACKGROUND OF THE INVENTION

The invention relates to a liquid crystal display device having a plurality of pixel electrodes arrayed in a matrix form and, in particular, to a liquid crystal display device in which wiring lines are formed along the rows and columns of the pixel electrodes.

Recently, liquid crystal display devices of a high aperture ratio are demanded to attain high brightness or low power consumption. The aperture ratio can be improved by reducing a distance between a signal line and a pixel electrode, a distance between a scanning line and the pixel electrode, and a length which a light shielding film of a counter substrate overlaps the pixel electrode, within a range admissible in the manufacturing process.

Figure 1:
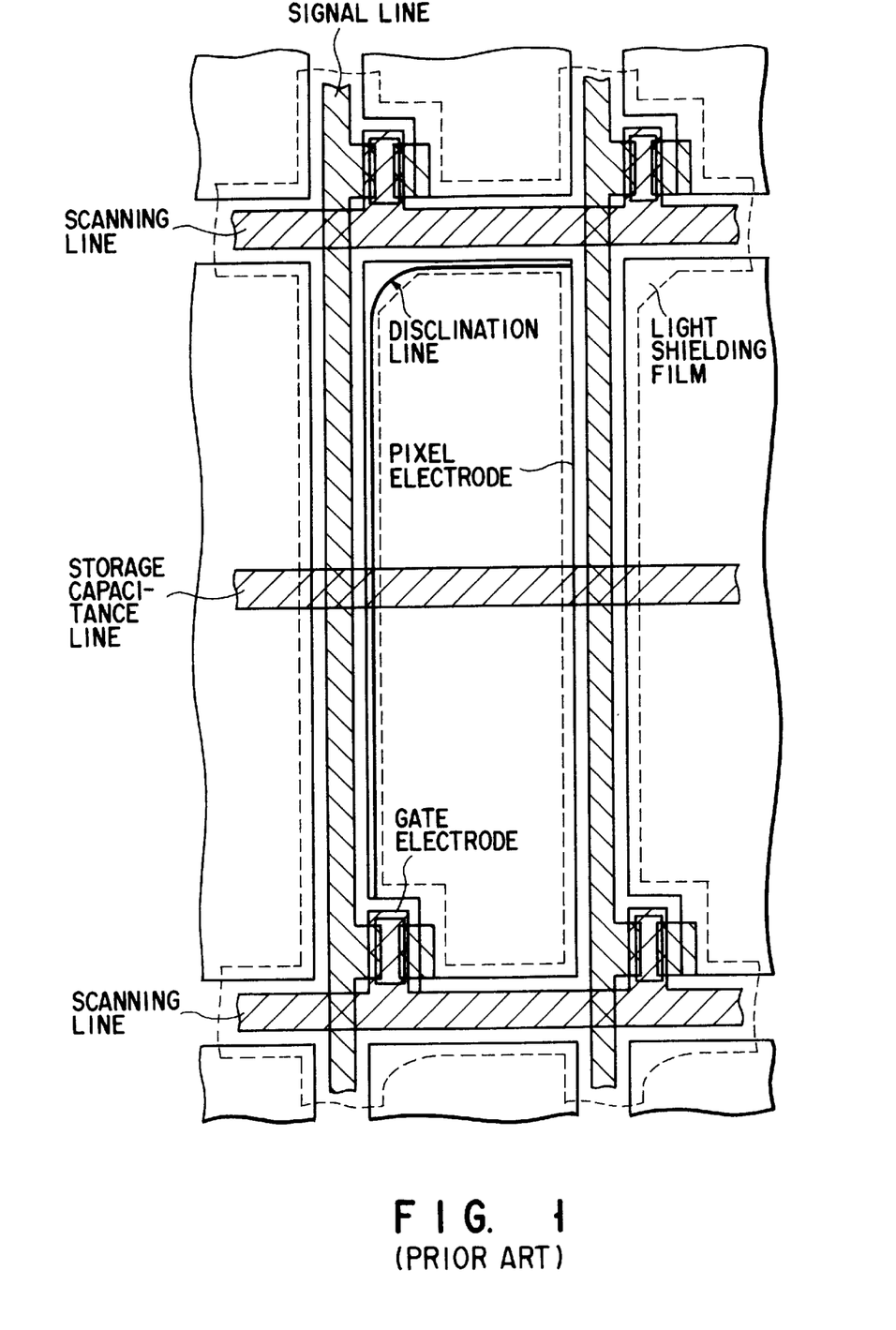
FIG. 1 is a plan view showing a disclination line appeared on the surface of a conventional array substrate.

In ordinary TFT (Thin Film Transistor)-type liquid crystal display devices, liquid crystal molecules are reversely tilted up in the vicinity of the scanning and signal lines due to lateral electric fields present between the scanning line and the pixel electrode and between the signal line and the pixel electrode. Thus, as shown in FIG. 1, a disclination line appears in a boundary area between the liquid crystal molecules tilted up at one end and the liquid crystal molecules tilted up at the other end. In this boundary area, it is difficult that the liquid crystal molecules are controlled to have a tilt-up angle corresponding to a voltage applied to the pixel electrode. If such a disclination line is located within the aperture for each pixel, defects such as a poor contrast, irregular image and residual image occur in the display operation, thereby degrading the display quality. To solve the aforementioned problem, the light shielding film is formed in a size capable of masking the disclination line.

Further, a dual domain technique, for example, is utilized for reducing the dependence of the liquid crystal display device upon a viewing angle. In this technique, each pixel is divided into two domains and the liquid crystal molecules in one domain is aligned in an orientation opposite to that of the liquid crystal molecules in the other domain by means of an alignment film, so that the liquid crystal molecules to be tilted up under the applied voltage have pretilt-base ends reversed for each domain. Also in this case, a disclination line appears at the peripheries of the domains. Conventionally, a storage capacitance line is formed to have a shape capable of masking the disclination line so as to avoid the defects caused in the display operation by the disclination line.

In the structure as shown in FIG. 1, however, the disclination line is crooked in a pixel area near an intersection between the scanning line and the signal line. Since the disclination line is masked by increasing the overlap length which the light shielding film of the counter substrate overlaps the pixel electrode, the aperture ratio is lowered.

Figure 2:
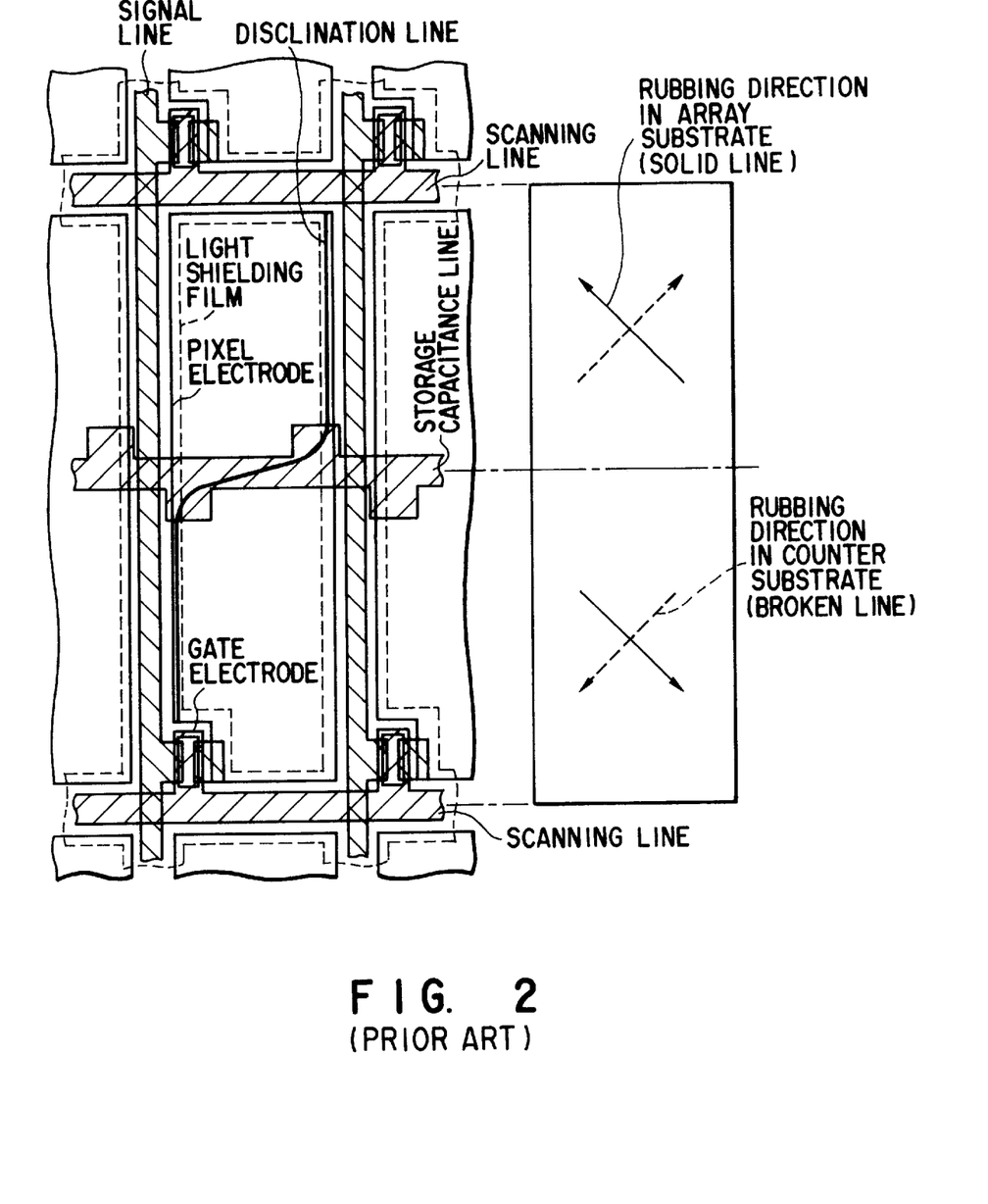
FIG. 2 is a plan view showing a disclination line appeared on the surface of a conventional array substrate of a dual domain type.

In the case where the dual domain technique is employed to reduce the dependence upon a viewing angle, the disclination line is also crooked near a boundary between the domains and not parallel to the scanning line, as shown in FIG. 2. Since the storage capacitance line must be formed such that the disclination line is masked, it is difficult to attain a sufficient aperture ratio.

BRIEF SUMMARY OF THE INVENTION

It is accordingly an object of the present invention to provide a liquid crystal display device which can prevent an aperture ratio from being lowered by necessity of masking a disclination line.

The object of the present invention is achieved by a liquid crystal display device comprising: an array substrate which includes a matrix array of pixel electrodes, a plurality of scanning wirings formed along the rows of the pixel electrodes, each for selecting the pixel electrodes of a corresponding row, a plurality of signal wirings formed along the columns of the pixel electrodes, for setting potentials of the pixel electrodes of a selected row, and an alignment film formed to cover the pixel electrodes, the scanning wirings and the signal wirings, a counter substrate which includes a counter electrode facing the matrix array of pixel electrodes, and an alignment film formed to cover the counter electrode, and a liquid crystal layer which is held between the array substrate and the counter substrate and has liquid crystal molecules aligned by the alignment films of the array and counter substrates, wherein at least one of the scanning and signal wirings is formed to have a specified shape at an intersection of the scanning and signal wirings located on a side corresponding to pretilt-base ends of the liquid crystal molecules aligned by the alignment films, and the specified shape is determined to reduce an electric field produced in the liquid crystal layer between the one wiring and the pixel electrode.

In the liquid crystal display device, at least one of the scanning and signal wirings has a specified shape determined to reduce an electric field produced in the liquid crystal layer between the one wiring and the pixel electrode. This enables that the disclination line extends through a point close to the intersection. Since a wide light shielding film is not required to mask the disclination line, the aperture ratio can be prevented from being lowered.

The object of the present invention is also achieved by a liquid crystal display device comprising an array substrate which includes a matrix array of pixel electrodes, a plurality of scanning wirings formed along the rows of the pixel electrodes, each for selecting the pixel electrodes of a corresponding row, a plurality of signal wirings formed along the columns of the pixel electrodes, for setting potentials of the pixel electrodes of a selected row, and an alignment film formed to cover the pixel electrodes, the scanning wirings and the signal wirings a counter substrate which includes a counter electrode facing the matrix array of pixel electrodes, and an alignment film formed to cover the counter electrode and a liquid crystal layer which is held between the array substrate and the counter substrate and has liquid crystal molecules aligned by the alignment films of the array and counter substrates wherein the alignment films of the array and counter substrates are divided for each pixel electrode to have first and second domains for aligning the liquid crystal molecules in orientations opposite to each other, and the first and second domains are arranged to have a boundary extending substantially straight across the pixel electrode and being slanted to a side corresponding to pretilt-base ends of the liquid crystal molecules at positions close to edges of the pixel electrode.

In this liquid crystal display device, the straight extending boundary of first and second domains is slanted to a side corresponding to pretilt-base ends of the liquid crystal molecules at positions near edges of the pixel electrode. This enables that the disclination line is corrected to extend in parallel with the scanning wiring. Since a wide light shielding film and a wide storage capacitance line are not required to mask the disclination line, the aperture ratio can be prevented from being lowered.

DETAILED DESCRIPTION OF THE INVENTION

A liquid crystal display device according to a first embodiment of the present invention will be described with reference to the accompanying drawings.

Figure 3:
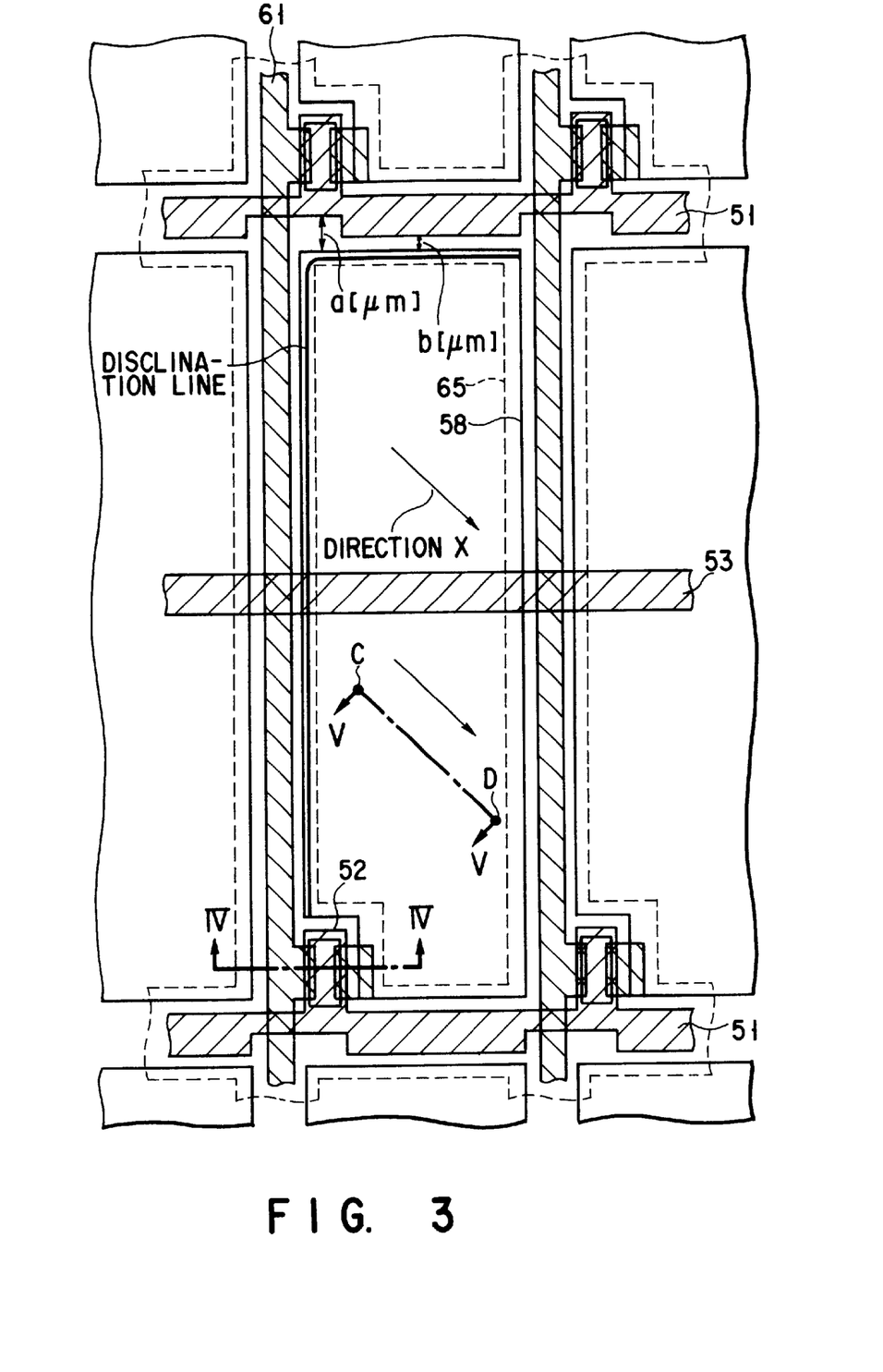
FIG. 3 is a plan view showing an array substrate of a liquid crystal display device according to a first embodiment of the present invention.
Figure 4:
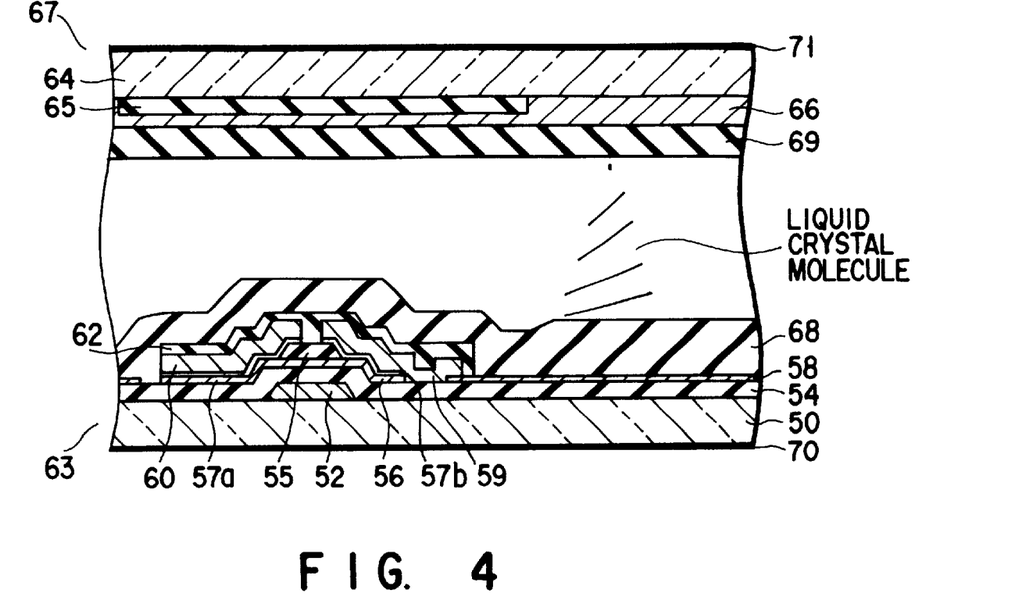
FIG. 4 is a cross-sectional view of the liquid crystal display device, as taken along line IV—IV in FIG. 3.
Figure 5:
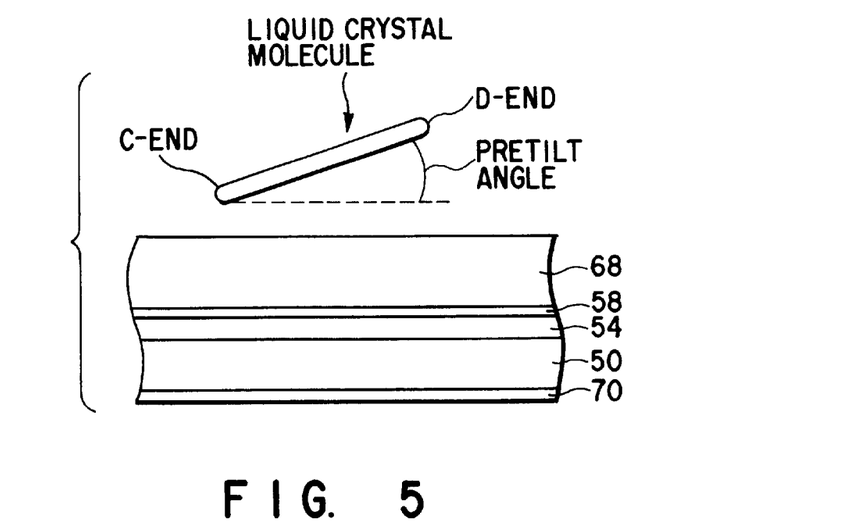
FIG. 5 is a cross-sectional view of the liquid crystal display device and a pretilted state of a liquid crystal molecule, as taken along line V—V in FIG. 3.

FIG. 3 shows a plane structure of an array substrate of the liquid crystal display device. FIG. 4 shows a cross-sectional structure of the liquid crystal display device, as taken along line IV—IV in FIG. 3. FIG. 5 shows a cross-sectional structure of the liquid crystal display device and a pretilted state of a liquid crystal molecule, as taken along line V—V in FIG. 3.

The arrangement of the liquid crystal display device is schematically explained with reference to FIG. 4. The liquid crystal display device has liquid crystals held between a counter substrate 67 and an array substrate 63 on which a plurality of thin film transistors are provided. In the array substrate, gate electrodes 52 and scanning lines are formed on a glass plate by using a single layer, so that the scanning lines have the same material as that of the gate electrodes. Semiconductor layers 56 are provided in areas corresponding to the gate electrodes with gate insulating films formed therebetween. Channel protection films 55 are formed on the semiconductor layers, and source and drain electrodes 59 and 60 are formed in a partly overlapped relation to the channel protection films 55 with ohmic contact layers 57b and 57a interposed therebetween. Pixel electrodes 58 are formed in contact with the source electrodes 58. Protection insulating films 62 are formed on required areas, and an alignment film 68 is finally formed thereon.

The counter substrate has a structure in which a light shielding film 65 is formed on a plate 64, and a counter electrode 66 and an alignment film 69 are formed to entirely cover a surface thereof.

The alignment films 68 and 69 of the array and counter substrates are obtained by alignment process.

The array and counter substrates are opposed to hold liquid crystal molecules sealed along with a spacer (not shown) therebetween using a sealing material (not shown) such that they have different alignment directions set at an angle of about 90 degrees. At this time, the liquid crystal molecules on the array substrate are aligned parallel to the alignment direction of the alignment film of the array substrate and the liquid crystal molecules on the counter substrate are aligned parallel to the alignment direction of the alignment film of the counter substrate. That is, alignments of the liquid crystal molecules are twisted by about 90 degrees between the array and counter substrates. In addition, the liquid crystal molecules on each of the array and counter substrates are not parallel to the substrate plane since they are pretilted up at one end in their alignment directions.

As shown in FIG. 4, a storage capacitance 53 and a gate electrode 52 constituting a portion of the scanning line 51 are initially formed on a glass plate 50 by depositing one or more layers of materials such as Ti, Cr, Al, Ta, Mo, W and Cu, or an alloy layer of some of the materials on one major surface of the plate 50 and etching the deposited layer into a desired pattern, for example. At this time, a cutout is provided in that area of the scanning line 51 which corresponds to an intersection with a signal line to be formed in a later step.

It has been found that an area at which a disclination line occur is ascribed to the pretilt orientations of the liquid crystal molecules. The "pretilt" is provided for determining one end of the liquid crystal molecule to be tilted up upon application of a voltage. Normally, each liquid crystal molecule is tilted up in an orientation identical to the pretilt orientation, but there is a kind of liquid crystal molecules each of which is tilted up in an orientation opposite to the pretilt orientation due to the property of itself or the alignment film. In the present embodiment, an alignment process is performed for causing the liquid crystal molecules to be tilted up on a side corresponding to the direction X shown in FIG. 3. Thus, each liquid crystal molecule is tilted up at a D-end, not at a C-end above the array substrate plane as shown in FIG. 5.

At this time, the disclination line is created along scanning and signal lines located on the C-end side of a pixel area as shown in FIG. 3, that is, along upper and left peripheries of the pixel area.

In the present embodiment, a cutout is formed in a pixel side portion of the scanning line located on the C-end side and along the upper periphery of the pixel area as shown in FIG. 3. At this time, distances a=5 μm and b=2 μm are provided between the scanning line 51 and the pixel electrode shown in FIG. 3. That is, the cutout has a width narrowed by about 3 μm with respect to the normal width of the scanning line. Since the normal width is greater than 10 μm, the resistance of the scanning line, for example is not extremely increased by the cutout. Therefore, no adverse effect is exerted on the display.

The provision of the aforementioned cutout causes the disclination line to be displaced toward the scanning line side from the conventional position around the intersection, so that the disclination line has a form reliably extending along the scanning line and signal line. That is, the disclination line is deformed from the form shown in FIG. 1 to the improved form shown in FIG. 3.

Since lateral electric fields from the scanning and signal lines are overlapped around the intersection thereof, a greater lateral electric field is applied to a part of the pixel area adjacent to the intersection than that applied to another part thereof remote from the intersection. Thus, the lateral electric field from one of the scanning and signal lines is weakened such that the lateral electric field applied to the adjacent part of the pixel area is made substantially equal to that applied to the other part remote from the intersection, thereby causing the disclination line to have a form reliably extending along the signal and scanning lines. As the disclination line has the above-mentioned improved form, the area of the light shielding film masking the disclination line can be reduced. The aperture ratio will be improved as a result of the reduction. For the conventional case as shown in FIG. 1, the light shielding film has an oblique outline relative to the scanning line 51 and signal line 61 so as to mask a part of the disclination line produced near the intersection. In this case, accuracy is required in the alignment of the light shielding film. It is, therefore, necessary to take a greater margin for the positional alignment. According to the present embodiment, however, the light shielding film can be in parallel with the scanning and signal lines as shown in FIG. 3 so as to facilitate the alignment of the light shielding film. Thus, the aperture ratio can be improved by reducing the alignment margin.

In this device, a gate insulating film 54 of, for example, SiOx is formed by a plasma CVD (chemical vapor deposition) method.

Further, for example, an amorphous silicon (a-Si) layer and an insulating film of SiNx are formed over the gate insulating film 54 by a plasma CVD method. Here, the insulating film is patterned by a self-alignment method using the gate electrode as a mask. That is, a photosensitive resist is coated on the insulating film and exposed by light applied from the rear surface side of the gate electrode, so that it can be left above the gate electrode. In this state, the insulating film is etched into a pattern of the channel protection film 55.

The semiconductor layer 56 and ohmic contact layer 57 are formed by providing an n type a-Si layer on the structure described above and simultaneously patterning the n type a-Si layer and the previously formed a-Si layer into an island form.

The pixel electrode 58 is formed by sputtering, for example, an ITO (indium tin oxide) film and then etching the ITO film into a predetermined form. The source electrode 59, drain electrode 60 and signal line 61 are formed by sputtering one or more materials such as Ti, Cr, Al, Ta, Mo, W and Cu, or an alloy of some of the materials and etching the same into a predetermined form.

Finally, the protection insulating film 62 of SiNx is formed over a whole surface by a plasma CVD method and removed from an area corresponding to the pixel electrode by etching to obtain the array substrate as desired.

In the counter substrate, a Cr film for instance is formed on one surface of a glass plate, for example, and then etched into a predetermined pattern determined by the pattern accuracy and assembly accuracy to obtain the light shielding film 65. At this time, the light shielding film 65 is so formed as also to mask a disclination line. Further, the counter electrode 66 is formed of ITO to obtain the counter electrode 66.

Thereafter, polyimide films of a low-temperature cure type are printed to entirely coat the electrode containing surfaces of the array substrate 63 and counter substrate 67 electrodes formed as described above. The alignment films 68 and 69 are formed by a rubbing or alignment process of the polyimide films. In the present embodiment, the rubbing process is effected toward the direction X (which is set at an angle of about 45 degrees with respect to the scanning line 51 and signal line 61) as shown in FIG. 3, so that the liquid crystal molecules are tilted up on a side corresponding to the direction X.

The array substrate 63 and counter substrate 67 are opposed such that their alignment directions are set an angle of about 90 degrees, and bonded to form an empty cell therebetween. At this time, the positional relation between the array substrate 63 and counter substrate 67 are adjusted utilizing alignment marks provided at predetermined portions of the these substrates.

Then, a liquid crystal material is filled into the empty cell and polarizing plates 70 and 71 are affixed to the rear surfaces of the array substrate 63 and counter substrate 67 to complete a liquid crystal display device of the present embodiment.

The liquid crystal display device formed as described above has a cutout positioned around the intersection of the scanning line and the signal line. Since the side of the scanning line 51 is displaced back at a position corresponding to the cutout, a disclination line is created along the pixel end. Accordingly, the area of the light shielding film 65 can be reduced to improve the aperture ratio.

In the present invention, it is only necessary that the lateral electric field applied from the scanning line 51 or signal line 61 be made weaker at one part of the pixel area close to the intersection than at the other part remote from the intersection. This object of the present invention can also be achieved by forming a cutout on the signal line, instead of the scanning line.

Figure 6:
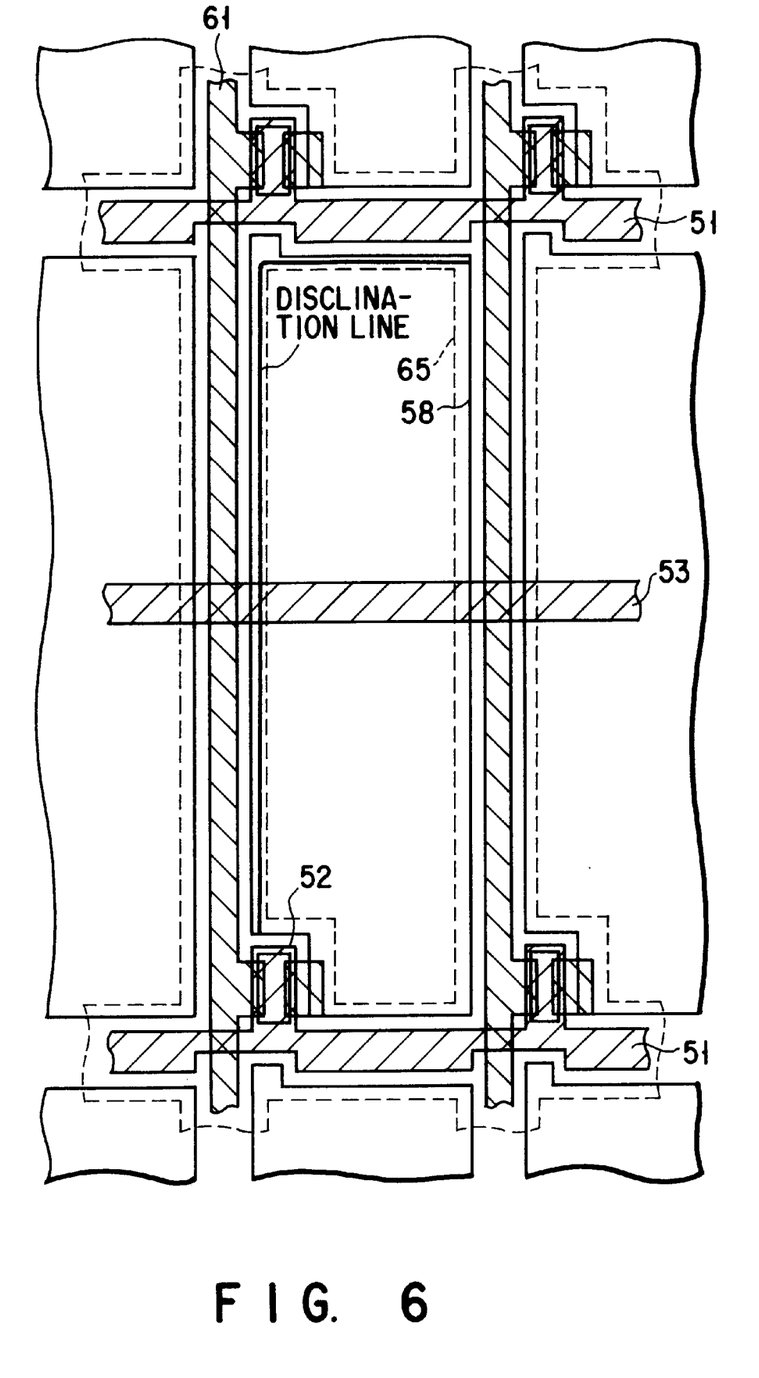
FIG. 6 is a plan view showing a first modification of the array substrate shown in FIG. 3.

The above-mentioned embodiment can be variously modified without departing from the spirit and scope of the present invention. The pixel electrode 58 may be formed to extend into a space corresponding to the cutout as shown in FIG. 6.

Figure 7:
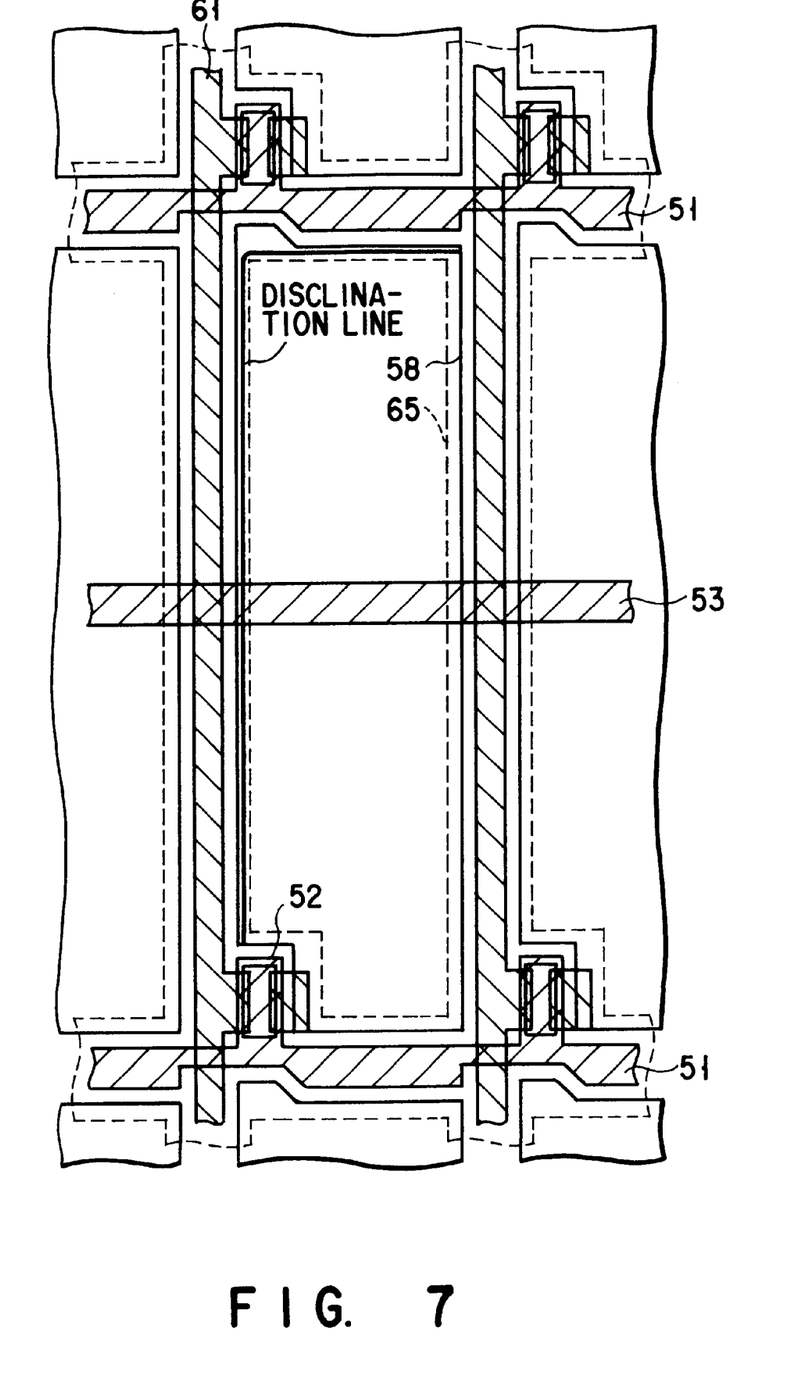
FIG. 7 is a plan view showing a second modification of the array substrate shown in FIG. 3.

FIG. 7 shows an example of the cutout created by a continuous change in the width of the scanning line 51. Further, the cutout may be formed to have a curved outline. The shape of the cutout may be variously modified to draw up the disclination line close to the scanning line 51 or signal line 61.

Although, in the above-mentioned embodiment, the direction of the alignment process is set at an angle of about 45 degrees to the scanning line 51 and signal line 61, it may be set in any other directions. The present invention can also be applicable to the case where the alignment process is done, for example, in a direction parallel to the scanning line 51 or signal line 61. In the case where the alignment process is to be made in the direction parallel to the signal line 61, cutouts or the like may be provided around two intersections between the scanning and signal lines 51 and 61.

A liquid crystal display device according to a second embodiment of the present invention will be described with reference to the accompanying drawings.

The second embodiment relates to a so-called dual domain technique of dividing each pixel area into two domains whose alignment directions are different from each other to obtain a wide viewing angle.

Figure 8:
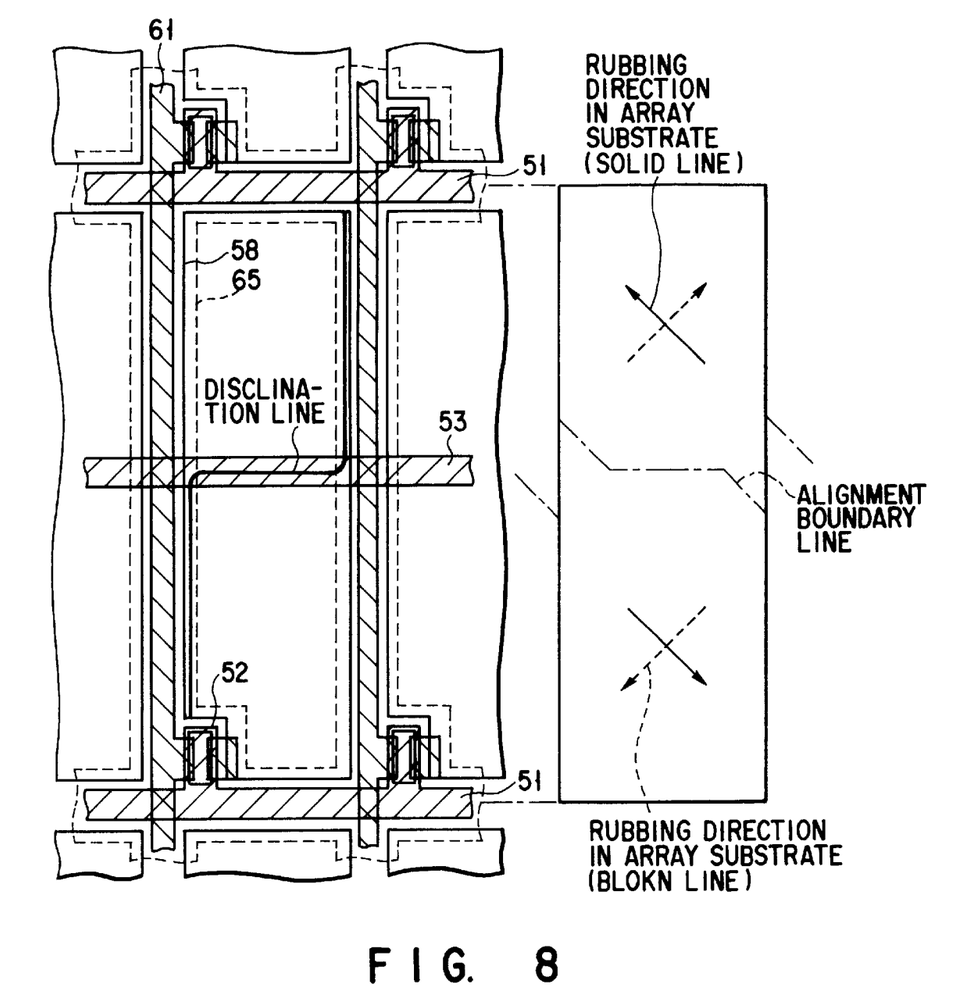
FIG. 8 is a plan view showing an array substrate of a liquid crystal display device according to a second embodiment of the present invention.

FIG. 8 shows an array substrate of the liquid crystal display device.

The second embodiment is similar to the first embodiment except in their rubbing processes. Below is one example of rubbing processes performed under the dual domain technique.

In this dual domain technique, a first rubbing process of rubbing the whole surface of an alignment film is effected in one direction. After the first rubbing process, a resist is coated on the alignment film, and a photolithography process is carried out using a mask pattern which masks a domain corresponding to the half of each pixel to leave a domain corresponding to the remainder of the pixel.

A second rubbing process is effected in a direction opposite to that of the first rubbing process. The resist is finally removed to obtain an array substrate having two alignment directions for each pixel.

The same process is performed on a counter electrode so that the alignments are matched between the array substrate and the counter substrate to be affixed to each other. Note that a rubbing process of one direction is also applicable to the counter substrate.

Hereinafter, a boundary between the two domains is called as an alignment boundary line. In the present embodiment, the alignment boundary line is deformed from a straight line into a serrated form at both ends of each pixel area. This can be realized by preparing a mask pattern suitable for the above-mentioned rubbing process.

The alignment boundary line has the form set out above. At the time of the displaying operation, this alignment boundary line causes the disclination line to extend substantially parallel to the scanning line and also extend along the signal lines without being dull at the turning points. The alignment boundary line is not limited to the serrated form and may be modified to have a curve if the disclination line can extend in a straight line parallel to the scanning line.

As a result, it is possible to prevent the areas of the light shielding film and storage capacitance line which mask the disclination line from being excessively increased, thus improving the aperture ratio.

In the conventional case as shown in FIG. 2, the light shielding film and storage capacitance line are not formed straight and have projections for masking the disclination line. This configuration demands a positional accuracy and it is, therefore, necessary to take a greater margin for positional alignment. In the present embodiment, since the light shielding film and storage capacitance line for masking the disclination line can be formed straight to facilitate positional alignment thereof, it is possible to improve the aperture ratio by reducing the alignment margin.

We claim:

1. A liquid crystal display device comprising:

an array substrate which includes a matrix array of pixel electrodes, a plurality of scanning wirings formed along rows of the pixel electrodes, each for selecting the pixel electrodes of a corresponding row, a plurality of signal wirings formed along columns of the pixel electrodes, for setting potentials of the pixel electrodes of a selected row, and an alignment film formed to cover the pixel electrodes, the scanning wirings and the signal wirings;

a counter substrate which includes a counter electrode facing the matrix array of pixel electrodes, and an alignment film formed to cover the counter electrode; and a liquid crystal layer which is held between said array substrate and said counter substrate and has liquid crystal molecules aligned by the alignment films of said array and counter substrates;

wherein at least one of the scanning and signal wirings is formed to have a portion of a specified shape at an intersection of the scanning and signal wirings located on a side corresponding to pretilt-base ends of the liquid crystal molecules aligned by the alignment films, and the specified shape is determined to reduce an electric field produced in the liquid crystal layer between the one wiring and the pixel electrode.

2. A liquid crystal display device according to claim 1, wherein said portion of the specified shape is a cutout removed in a direction opposite to the pixel electrode at the intersection.

3. A liquid crystal display device according to claim 2, wherein said cutout is made broader than a width of another wiring located at the intersection.

4. A liquid crystal display device according to claim 1, wherein said pretilt-base end is set on a rubbing origin side of the alignment layer.

5. A liquid crystal display device according to claim 2, wherein the cutout is formed in the scanning line.

6. A liquid crystal display device according to claim 5, further comprising a plurality of switching elements arranged near intersections of the scanning and signal wirings, for electrically connecting a corresponding signal wiring to a corresponding pixel electrode under a control of a corresponding scanning line; each of said switching elements being formed of a thin film transistor which has a channel length substantially equal to a width of the cutout.

7. A liquid crystal display device according to claim 1, wherein said portion of the specified shape is formed such that a disclination line is created along a periphery of the pixel electrode under electric fields between the scanning and signal wirings and the pixel electrode.

8. A liquid crystal display device according to claim 7, further comprising a light shielding layer overlapped with the pixel electrode to mask the disclination line.

9. A liquid crystal display device according to claim 8, wherein an overlapped width between the light shielding layer and the pixel electrode is made substantially constant.

10. A liquid crystal display device comprising:

an array substrate which includes a matrix array of pixel electrodes, a plurality of scanning wirings formed along rows of the pixel electrodes, each for selecting the pixel electrodes of a corresponding row, a plurality of signal wirings formed along columns of the pixel electrodes, for setting potentials of the pixel electrodes of a selected row, and an alignment film formed to cover the pixel electrodes, the scanning wirings and the signal wirings;

a counter substrate which includes a counter electrode facing the matrix array of pixel electrodes, and an alignment film formed to cover the counter electrode; and a liquid crystal layer which is held between said array substrate and said counter substrate and has liquid crystal molecules aligned by the alignment films of said array and counter substrates;

wherein the alignment films of said array and counter substrates are divided for each pixel electrode to have first and second domains for aligning the liquid crystal molecules in orientations opposite to each other, and the first and second domains are arranged to have a boundary extending substantially straight across the pixel electrode and being slanted to a side corresponding to pretilt-base ends of the liquid crystal molecules at positions close to edges of the pixel electrode.

11. A liquid crystal display device according to claim 10, further comprising a light shielding layer covering the boundary.

12. A liquid crystal display device according to claim 11, further comprising a plurality of switching elements arranged near intersections of the scanning and signal wirings, for electrically connecting a corresponding signal wiring to a corresponding pixel electrode under a control of a corresponding scanning line; each of said switching elements being formed of a thin film transistor which has a channel length substantially equal to a width of the cutout.

* * * * *